United States Patent
Beaver et al.

(10) Patent No.: US 10,421,368 B2
(45) Date of Patent: Sep. 24, 2019

(54) STATIC POWER DERATING FOR DYNAMIC CHARGING

(71) Applicant: WiTricity Corporation, Watertown, MA (US)

(72) Inventors: Jonathan Beaver, Auckland (NZ); Michael Le Gallais Kissin, Auckland (NZ); Chang-Yu Huang, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 65 days.

(21) Appl. No.: 15/497,241

(22) Filed: Apr. 26, 2017

(65) Prior Publication Data

US 2018/0312080 A1    Nov. 1, 2018

(51) Int. Cl.
| | |
|---|---|
| *B60L 15/20* | (2006.01) |
| *H02J 7/02* | (2016.01) |
| *B60L 53/12* | (2019.01) |
| *B60L 58/12* | (2019.01) |
| *H02J 7/04* | (2006.01) |
| *H02J 50/12* | (2016.01) |
| *H02J 50/80* | (2016.01) |

(52) U.S. Cl.
CPC .......... *B60L 15/2045* (2013.01); *B60L 53/12* (2019.02); *B60L 58/12* (2019.02); *H02J 7/025* (2013.01); *H02J 7/042* (2013.01); *H02J 50/12* (2016.02); *H02J 50/80* (2016.02); *B60Y 2200/91* (2013.01); *Y02T 10/7258* (2013.01)

(58) Field of Classification Search
CPC .............. B60L 15/2045; B60L 11/1861; B60L 11/182; H02J 7/042; H02J 7/025; B60Y 2200/91

USPC .................. 320/108; 455/41.1, 573; 307/104
See application file for complete search history.

(56) References Cited

U.S. PATENT DOCUMENTS

| | | | | |
|---|---|---|---|---|
| 5,807,201 | A * | 9/1998 | Kim ........................ | F16H 3/089 475/203 |
| 5,982,139 | A * | 11/1999 | Parise ........................ | B60L 8/00 320/109 |
| 7,705,748 | B2 * | 4/2010 | Fu ........................... | B60Q 9/008 340/425.5 |
| 7,918,762 | B2 * | 4/2011 | Muta ...................... | B60W 20/13 477/97 |

(Continued)

OTHER PUBLICATIONS

Foote A., et al., "Sizing Dynamic Wireless Charging for Light-Duty Electric Vehicles in Roadway Applications", Power Electronics and Electric Machinery Research Center, 2016, pp. 224-230.

*Primary Examiner* — M Baye Diao
(74) *Attorney, Agent, or Firm* — Colby Nipper PLLC

(57) ABSTRACT

Certain aspects of the present disclosure are generally directed to apparatus and techniques for apparatus for wireless charging. The apparatus generally includes a first wireless charging element, and transmit circuitry coupled to the first wireless charging element and configured to supply power to the first wireless charging element to transmit a wireless charging field to a vehicle. In certain aspects, the apparatus also includes a controller coupled to the transmit circuitry and configured to determine a charging condition indicative of a speed of the vehicle, and adjust the power supplied to the first wireless charging element via the transmit circuitry based on the determination.

30 Claims, 6 Drawing Sheets

(56) References Cited

U.S. PATENT DOCUMENTS

| | | | |
|---|---|---|---|
| 8,469,122 B2 | 6/2013 | Perlman et al. | |
| 9,106,203 B2* | 8/2015 | Kesler | H03H 7/40 |
| 9,469,207 B2 | 10/2016 | Keeling et al. | |
| 9,608,465 B2* | 3/2017 | Keeling | H02J 7/0052 |
| 9,806,767 B2* | 10/2017 | Walley | G06K 7/10207 |
| 9,859,755 B2* | 1/2018 | Beaver | H02J 5/005 |
| 9,987,937 B1* | 6/2018 | Mohamed | H02J 3/32 |
| 2003/0098185 A1* | 5/2003 | Komeda | B60K 6/105 |
| | | | 180/65.25 |
| 2010/0244583 A1* | 9/2010 | Shimokawa | H01Q 7/00 |
| | | | 307/104 |
| 2011/0115430 A1* | 5/2011 | Saunamaki | H02J 5/005 |
| | | | 320/108 |
| 2011/0148215 A1* | 6/2011 | Marzetta | H02J 5/005 |
| | | | 307/104 |
| 2013/0214591 A1* | 8/2013 | Miller | H02J 5/005 |
| | | | 307/9.1 |
| 2013/0214611 A1* | 8/2013 | Bae | H02M 7/06 |
| | | | 307/104 |
| 2014/0015330 A1* | 1/2014 | Byun | H02J 5/005 |
| | | | 307/104 |
| 2014/0021911 A1* | 1/2014 | Baarman | H02J 7/025 |
| | | | 320/108 |
| 2015/0251552 A1 | 9/2015 | Noack et al. | |
| 2015/0303714 A1* | 10/2015 | Keeling | B60L 11/1809 |
| | | | 320/108 |
| 2016/0001662 A1* | 1/2016 | Miller | B60L 11/182 |
| | | | 307/104 |
| 2016/0023557 A1* | 1/2016 | Dimke | B60L 5/42 |
| | | | 320/108 |
| 2016/0036263 A1* | 2/2016 | Liao | H02J 50/23 |
| | | | 320/108 |
| 2016/0156229 A1* | 6/2016 | Sakata | H02J 17/00 |
| | | | 307/104 |
| 2016/0190815 A1* | 6/2016 | Keeling | H02J 5/005 |
| | | | 307/104 |
| 2016/0332572 A1* | 11/2016 | Gibeau | B60R 1/00 |
| 2016/0339785 A1 | 11/2016 | Rumbak | |
| 2016/0368387 A1* | 12/2016 | Pavlovsky | H02J 7/025 |
| 2017/0129341 A1* | 5/2017 | Hosaka | B60L 7/18 |
| 2017/0282732 A1* | 10/2017 | Lewis | B60L 53/39 |
| 2017/0355270 A1* | 12/2017 | Elshaer | B60L 53/12 |
| 2017/0358960 A1* | 12/2017 | Percebon | H02J 50/80 |
| 2018/0212470 A1* | 7/2018 | Leem | H02J 50/12 |
| 2018/0275654 A1* | 9/2018 | Merz | G01S 13/9303 |
| 2019/0126775 A1* | 5/2019 | Han | G05B 19/418 |

* cited by examiner

STATIC POWER DERATING FOR DYNAMIC CHARGING

TECHNICAL FIELD

The present disclosure relates generally to electronic devices, and in particular, to wireless charging.

BACKGROUND

Electric vehicles (EV) are designed to derive locomotion power from electricity received from an energy storage device, such as a battery. For example, hybrid electric vehicles include on-board chargers that use power from vehicle braking and traditional motors to charge the vehicles. Vehicles that are solely electric generally receive power for charging the batteries of the vehicle from other sources. EVs are often proposed to be charged through some type of wired alternating current (AC) source, such as household or commercial AC supply sources. The wired charging connections use cables or other similar connectors that are physically connected to a power supply. Cables and similar connectors may be inconvenient or cumbersome and have other drawbacks. Wireless charging systems that are capable of transferring power in free space (e.g., via a wireless field) to be used to charge electric vehicles may overcome some of the deficiencies of wired charging solutions. As such, design of wireless charging systems and methods that efficiently transfer power for charging EVs are important.

SUMMARY

Certain aspects of the present disclosure are directed to an apparatus for wireless charging. The apparatus may generally include a first wireless charging element, transmit circuitry coupled to the first wireless charging element and configured to supply power to the first wireless charging element to transmit a wireless charging field to a vehicle, and a controller coupled to the transmit circuitry and configured to determine a charging condition indicative of a speed of the vehicle, and adjust the power supplied to the first wireless charging element via the transmit circuitry based on the determination.

Certain aspects of the present disclosure are directed to an apparatus for wireless charging a vehicle having a battery. The apparatus may generally include a wireless power receiving element, receive circuitry coupled to the wireless power receiving element, and a controller coupled to the receive circuitry and configured to determine an indication of a speed the vehicle and to adjust a power transferred to the battery from the wireless power receiving element.

Certain aspects of the present disclosure are directed to a method for wireless charging. The method generally includes supplying power to a first wireless charging element to transmit a wireless charging field to a vehicle and determining a charging condition indicative of a speed of the vehicle, wherein an amount of the power supplied to the first wireless charging element is adjusted based on the determination.

Certain aspects of the present disclosure are directed to a method for wireless charging a vehicle having a battery. The method generally includes transferring power to the battery from a wireless power receiving element and determining an indication of a speed of the vehicle, wherein an amount of the power transferred to the battery is adjusted based on the determination.

Certain aspects of the present disclosure provide an apparatus for wireless charging. The apparatus generally includes means for supplying power to a first wireless charging element to transmit a wireless charging field to a vehicle; and means for determining a charging condition indicative of a speed of the vehicle, wherein an amount of the power supplied to the first wireless charging element is adjusted based on the determination.

Certain aspects of the present disclosure provide an apparatus for wireless charging a vehicle having a battery. The apparatus generally includes means for transferring power to the battery from a wireless power receiving element and means for determining an indication of a speed of the vehicle, wherein an amount of the power transferred to the battery is adjusted based on the determination.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the present disclosure. In similar fashion, while exemplary aspects may be discussed below as device, system, or method aspects it should be understood that such exemplary aspects can be implemented in various devices, systems, and methods.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

Figure 1:
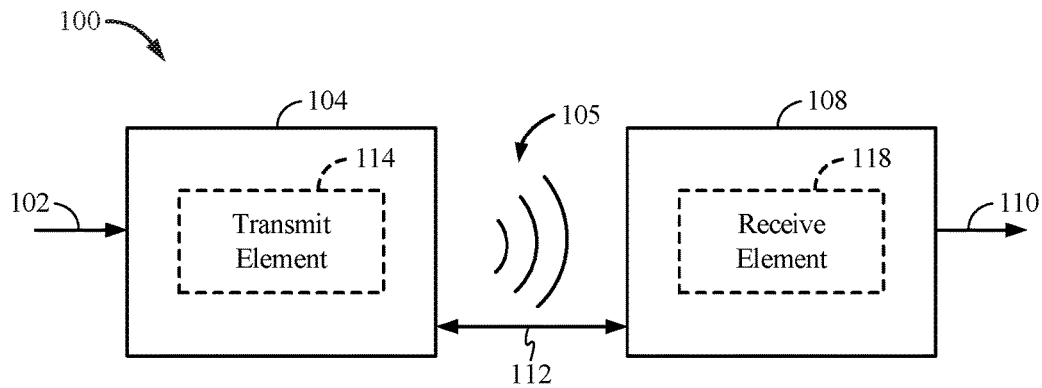
FIG. 1 is a functional block diagram of a wireless power transfer system, in accordance with certain aspects of the present disclosure.

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "wireless power receiving element" to achieve power transfer. In certain aspects, the wireless power receiving element may be located in an electric vehicle (EV) and used to charge a battery of the EV, as will be described in more detail herein.

FIG. 1 is a functional block diagram of a wireless power transfer system 100, in accordance with certain aspects of the present disclosure. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (e.g., a battery of an EV) coupled to the output power 110. The transmitter 104 and the receiver 108 may be separated by a distance 112. The transmitter 104 may include a wireless power transmitting element 114 for transmitting/coupling energy to the receiver 108. The receiver 108 may include a wireless power receiving element 118 for receiving or capturing/coupling energy transmitted from the transmitter 104.

In one illustrative aspect, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain implementations, the transmitter 104 may output a time-varying magnetic (or electromagnetic) field with a frequency corresponding to the resonant frequency of the wireless power transmitting element 114. When the receiver 108 is within the wireless field 105, the time varying magnetic (or electromagnetic) field may induce a current in the wireless power receiving element 118. As described above, if the wireless power receiving element 118 is configured as a resonant circuit to resonate at the frequency of the wireless power transmitting element 114, energy may be efficiently transferred. An alternating current (AC) signal induced in the wireless power receiving element 118 may be rectified to produce a direct current (DC) signal that may be provided to charge or to power a load (e.g., a battery of an EV). In certain aspects of the present disclosure, an amount of power transferred from the wireless power transmitting element 114 to the wireless power receiving element to charge a battery of an EV may be adjusted based on a charging condition of the EV.

Figure 2:
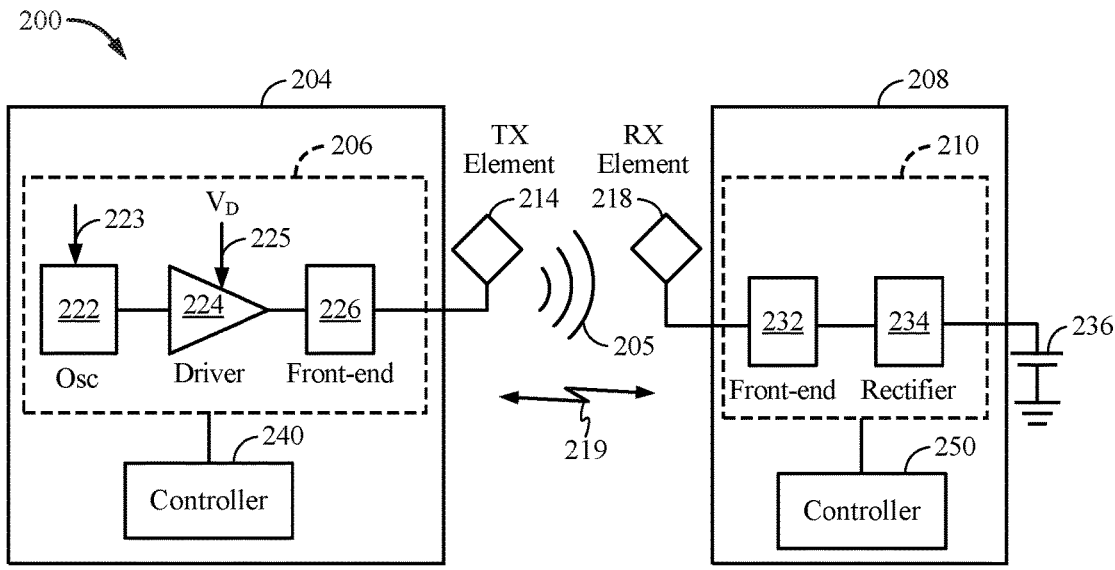
FIG. 2 is a functional block diagram of a wireless power transfer system, in accordance with certain aspects of the present disclosure.

FIG. 2 is a functional block diagram of a wireless power transfer system 200, in accordance with certain aspects of the present disclosure. The system 200 may include a transmitter 204 and a receiver 208. The transmitter 204 may include transmit circuitry 206 that may include an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal ($V_D$) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. For example, in certain aspects of the present disclosure, the controller 240 may determine a charging condition of an EV and adjust the power transfer by the transmit circuitry based on the charging condition. In some cases, the transmitter 204 may further include a memory (not shown) configured to store data, for example, such as instructions for causing the controller 240 to perform particular functions, such as those related to management of wireless power transfer as will be described in more detail herein.

The receiver 208 may include receive circuitry 210 that may include a front-end circuit 232 and a rectifier circuit 234. The front-end circuit 232 may include matching circuitry configured to match the impedance of the receive circuitry 210 to the impedance of the power receiving element 218. The transmitting and receiving elements 214 and 218 may also be referred to herein as wireless charging elements. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

In certain aspects of the present disclosure, the receiver 208 may be configured to determine whether an amount of power transmitted by the transmitter 204 and received by the receiver 208 is appropriate for charging the battery 236. In certain aspects, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer. In certain aspects of the present disclosure, the controller 250 may be configured to determine a charging condition of an EV, and adjust an amount of power transferred to wireless power receiver based on the charging condition. As discussed above, transmitter 204 and receiver 208 may be separated by a distance and may be configured according to a mutual resonant relationship to reduce transmission losses between the transmitter 204 and the receiver 208.

Figure 3:
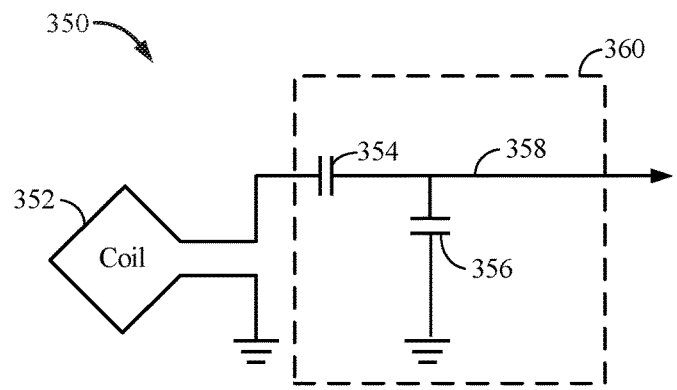
FIG. 3 is a schematic diagram of a portion of transmit circuitry or receive circuitry of FIG. 2 including a power transmitting or receiving element, in accordance with certain aspects of the present disclosure.

FIG. 3 is a schematic diagram of a portion of the transmit circuitry 206 or the receive circuitry 210 of FIG. 2, in accordance with certain aspects of the present disclosure. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure). In certain aspects of the present disclosure, an amount of power transferred from the power transmitting element 352 (or to the receiving element 352) may be adjusted based on a charging condition of an EV.

When the power transmitting or receiving element 352 is configured as a resonant circuit or resonator with tuning circuit 360, the resonant frequency of the power transmitting or receiving element 352 may be based on inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some aspects, the tuning circuit in the front-end circuit 226 may have the same design as the tuning circuit in front-end circuit 232. In other aspects, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

As presented above, design of wireless charging systems and methods that efficiently transfer power for charging EVs are important. Certain aspects of the present disclosure are generally directed to a dynamic wireless power transfer system that is capable of transferring power to an EV in motion. The design of a wireless power transfer system is a balancing act between a large number of different variables. One of the main goals in the design of the system may be to transfer enough power to keep an EV moving without having to rely on draining the battery. In this fashion, the wireless power transfer system may have the ability to give what is effectively indefinite range to an EV, as long as the EV is operated on the system. Apart from the removal of range anxiety as a negative factor for EVs, the wireless power transfer system provides additional benefits such as allowing extra viability for smaller and cheaper battery packs and more efficient travel.

Another goal in the design of the wireless power transfer system is to reduce the total installed cost of the system. Given that the wireless power transfer system of the present disclosure may be relatively high power and designed such that it can be deployed over a large area, it is important for the system to be suitable for installation into many thousands of kilometers of roadway. Thus, a low-cost design using standardized components is important in order to keep unit costs down, but also to be made in such a way as to be cheaply deployable.

Moreover, there is a power transfer capability that is important to maintain for the wireless power transfer system such that an average vehicle is capable of moving. This factor provides a lower limit for the technical capabilities of the system. One key tradeoff that allows the cost and size of the system to be reduced is in the cooling systems. A system that is sized to cool efficiently for regular traffic flow (e.g., 60-100 kilometers per hour (km/h) with a single car every 2-3 seconds) can be designed to have around 10% the capacity of a system that is to run 100% of the time. This then leaves a problem where the system may overheat if operated outside the expected range.

Another tradeoff is in the sizing of any of the inductive or capacitive elements of the system. Designing these elements for intermittent operation allows for a reduction in size and cost, but runs the risk of overheating if the system is operated for extended periods of time.

Figure 4:
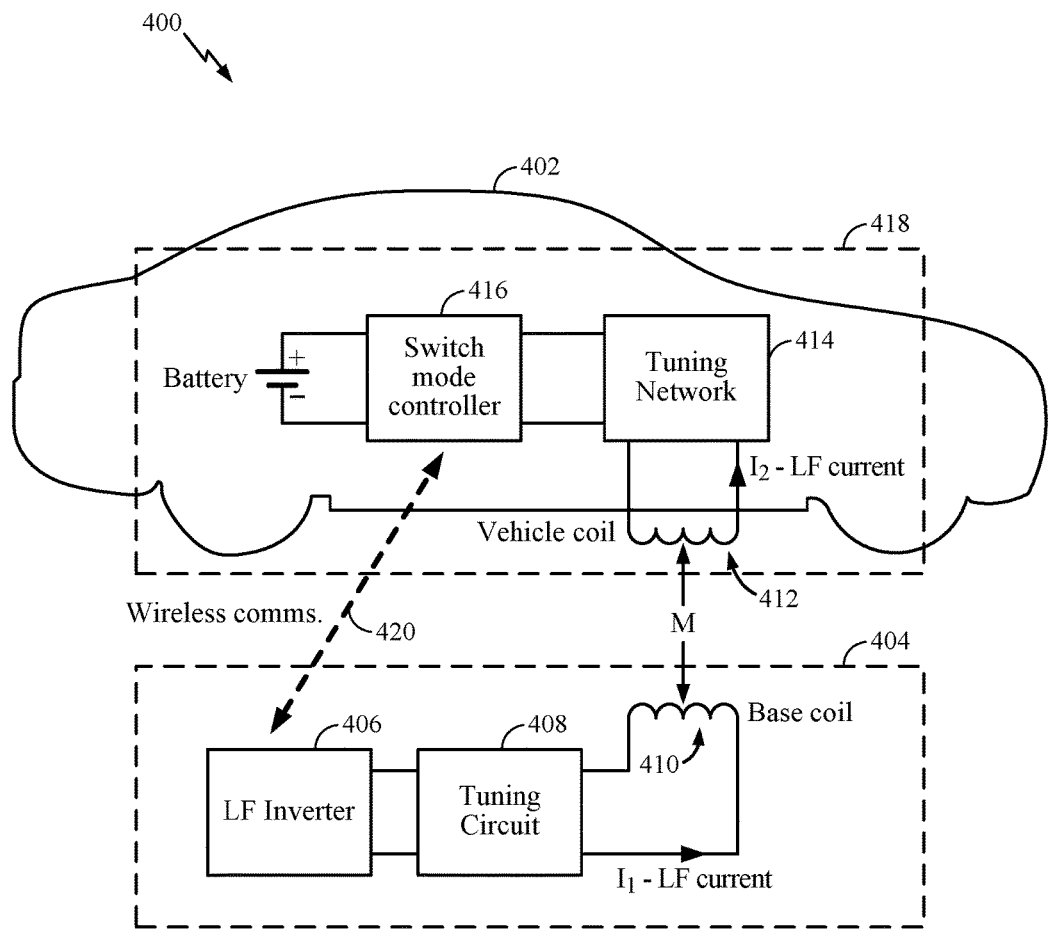
FIG. 4 is a functional block diagram of an example wireless power transfer system for charging a battery of a vehicle, in accordance with certain aspects of the present disclosure.

FIG. 4 is a functional block diagram of an example wireless power transfer system 400 for charging a battery of a vehicle 402, in accordance with certain aspects of the present disclosure. Transmit circuitry 404 may include an inverter 406 (e.g., a low-frequency (LF) inverter) configured to generate an alternating current (AC) signal. The output of the inverter 406 may be coupled to a tuning circuit 408 configured to supply a current $I_1$ (e.g., a LF current) to a wireless charging element, implemented via a coil 410. The coil 410 may be located in a base pad installed in a motorway. Supplying the current to coil 410 generates a magnetic field (M) that is coupled onto a wireless power receiving element, implemented via a coil 412, of a receiver circuit 418. As illustrated, the coil 412 may be located at a bottom of the vehicle 402. The coil 412 generates a current $I_2$ provided to a tuning network 414. In certain aspects, the tuning network 414 may be coupled to a switch mode controller 416 configured to generate a regulated DC voltage to charge the battery of the vehicle 402. The regulated DC voltage may also be used to provide direct power to one or more electronic components of the vehicle 402.

In certain aspects, the transmit circuitry 404 may be disposed in a motorway over which the vehicle 402 passes at a certain speed. While a single transmit circuit is illustrated in FIG. 4 to facilitate understanding, multiple transmit circuits may be located in the motorway, charging the battery of the vehicle 402 as the vehicle travels across base pads of each transmit circuit. In certain aspects, the transmit circuitry 404 and the receive circuitry 418 may be configured to communicate on a separate communication channel 420 (e.g., Bluetooth, Zigbee, cellular, etc.).

Example Techniques for Static Power Derating for Dynamic Charging

Dynamic wireless power transfer systems are generally designed for vehicles travelling at speed. A significant amount of power may be supplied to the coil 410 in order to be able to provide for a net positive energy transfer to the vehicle 402. To provide this power, relatively high power rated components may be used. Moreover, management of thermal losses becomes important due to the amount of power supplied to the coil 410. This situation can be mitigated by the assumption that, under normal conditions, each vehicle will be moving over the coil 410 for a limited amount of time, allowing for a lower average power and power loss. In other words, the faster the vehicle 402 moves across the coil 410, the less power the vehicle consumes from the coil, and vice versa. Thus, the transmit circuitry 404 and the receive circuitry 418 can be designed with a lower power rating resulting in a more cost effective design. However, issues may arise when a vehicle is stationary or moving too slowly across the coil 410. In other words, when the vehicle slows down, the average power delivered to the vehicle may increase, resulting in increased power loss and heating of components of the transmit circuitry 404 and the receive circuitry 418.

Figure 5:
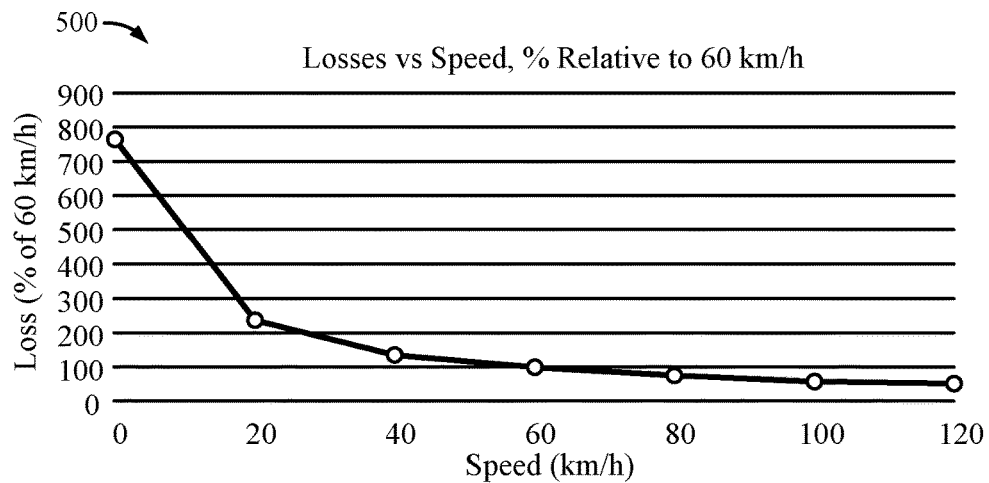
FIG. 5 is an example graph illustrating power loss of a transmitter as a function of vehicle speed, in accordance with certain aspects of the present disclosure.

FIG. 5 is an example graph 500 illustrating power loss of transmit circuitry (e.g., transmit circuitry 404) as a function of vehicle speed, in accordance with certain aspects of the present disclosure. The power loss on the y-axis indicates percent power loss relative to 60 kilometers per hour (km/h). As illustrated, power losses of the transmit circuitry increase at lower speeds due to the increased power consumption by the vehicle.

Certain aspects of the present disclosure provide a wireless power transfer system that can use various means to detect a charging condition of the vehicle (e.g., by determining the vehicle speed) and adjust the amount of power transferred to the vehicle accordingly. For example, the total power transferred from the transmit circuitry 404 to the receive circuitry 418 may be lowered when the vehicle's power demand is lowered. For example, when the vehicle is moving slowly, or is stopped, the total power transferred to the vehicle may be lowered. This technique allows for reduction of power losses by reducing power transfer while having a relatively low impact on user experience since a slower moving vehicle uses less power to remain in motion. In this case, derating the power supplied to the vehicle relative to the vehicle speed can still provide the vehicle's motive power plus battery charging power because as the motive power usage decreases with speed, so does the amount of power transferred to the vehicle.

Figure 6A:
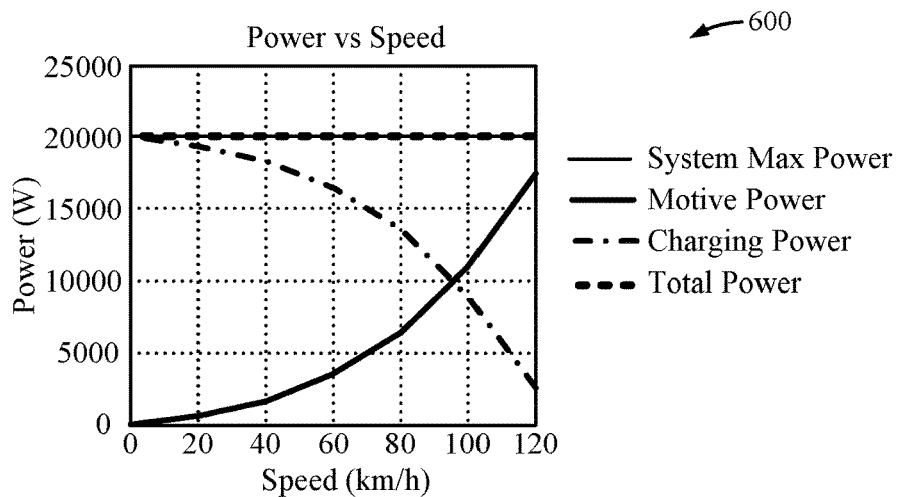
FIGS. 6A and 6B are example graphs illustrating total power transferred to a vehicle, battery charging power, and motive power, in accordance with certain aspects of the present disclosure.
Figure 6B:
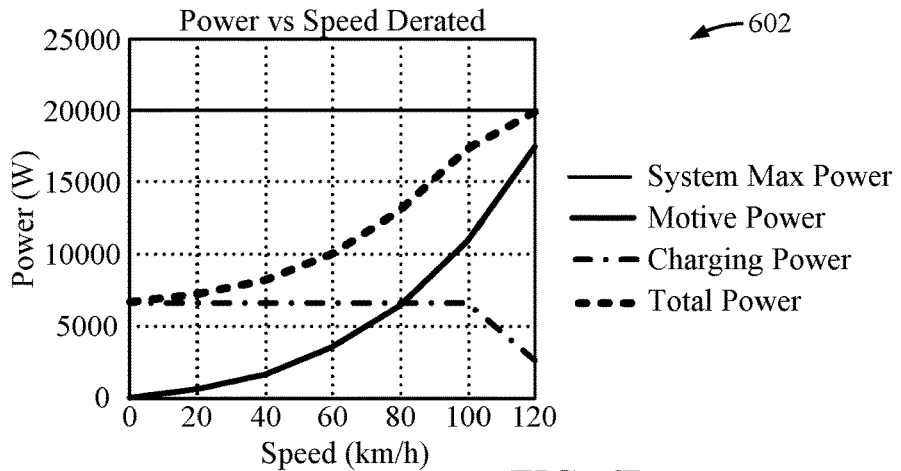

FIGS. 6A and 6B are example graphs 600 and 602 illustrating total power transferred to a vehicle, battery charging power, and motive power, in accordance with certain aspects of the present disclosure. As illustrated in graph 600, as the speed of the vehicle increases, the motive power increases. Since the total power transferred to the vehicle is constant in this case, the battery charging power decreases as the speed of the vehicle increases. In graph 602, the total power transferred to the vehicle is adjusted relative to the motive power and speed of the vehicle, maintaining a relatively constant battery charging power. In certain aspects, the amount of power transferred to a vehicle via a wireless charging element may be adjusted based on a power restriction (e.g., system max power) of the wireless charging element, and/or based on power restriction of a system of wireless charging elements (e.g., such as in a parking garage or section of roadway). In certain aspects, the amount of power transferred to a vehicle via a wireless charging element may be adjusted such that a certain charging rate of the battery of the vehicle is maintained.

Figure 7:
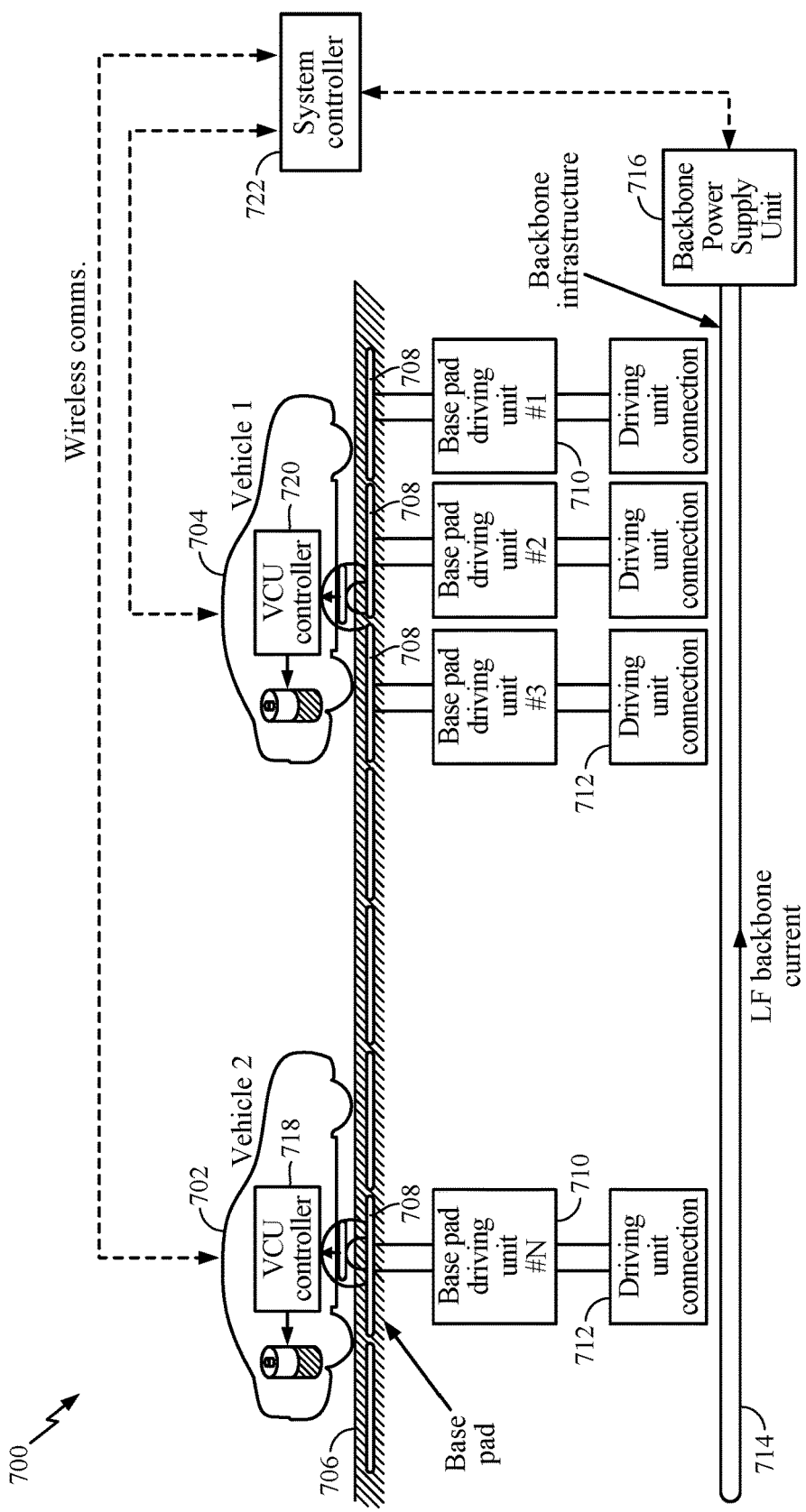
FIG. 7 is a functional block diagram of an example wireless power transfer system for charging vehicles on a roadway, in accordance with certain aspects of the present disclosure.

FIG. 7 is a functional block diagram of an example wireless power transfer system 700 for charging a battery of vehicles 702 and 704, in accordance with certain aspects of the present disclosure. As illustrated, the motorway 706 may include multiple base pads 708 over which the vehicles 702 and 704 may travel. Each of the base pads 708 may include a base coil, such as the base coil 410 described with respect to FIG. 4. The vehicles 702 and 704 may include vehicle charging unit (VCU) controllers 718 and 720 for charging respective batteries of each vehicle. The VCU controllers may include a tuning network and switch mode controller, such as the tuning network 414 and switch mode controller 416 described with respect to FIG. 4.

The base pads 708 may be coupled to base pad driving units 710 which may include a tuning circuit and inverter, such as the tuning circuit 408 and inverter 406 described with respect to FIG. 4. The base pad driving units 710 may be coupled to a power bus 714 of a backbone infrastructure via driving unit connection components 712, as illustrated. A power supply unit 716 may provide power to the base pad driving units 710 via the power bus 714.

In certain aspects, the power supply unit 716 may be controlled via a system controller 722. While the example wireless power transfer system 700 illustrates a single system controller 722 to facilitate understanding, multiple controllers may be used, each configured to control one or more of the base pad driving units 710. For example, each of the base pad driving units 710 may include a controller for adjusting an amount of power provided to a respective base pad. In some cases, the controllers coupled to each of the base pad driving units 710 may be in communication to control the wireless power transfer system 700.

In certain aspects, the system controller 722 may be configured to provide a control signal to the base pad driving units 710, based on which the base pad driving units 710 may adjust an amount of power provided to the base pads 708. For example, the system controller may determine a charging condition of a vehicle traveling across the base pads 708 and control the amount of power supplied to the base pads 708 via the control signal based on the charging condition. The charging condition may correspond to a power demand of the vehicle (e.g., vehicle 702) which may vary based on a power consumption of the vehicle (e.g., air conditioning (A/C) use and accessory power draw). In certain aspects, the charging condition of a vehicle may be determined based on an amount of power transferred to the vehicle from a respective base pad via the magnetic field generated by the base pad. For example, the amount of power transferred to a vehicle (e.g., vehicle 702) from one base pad may be used by the system controller 722 to determine an amount of power to be supplied to another base pad over which the vehicle may travel.

In certain aspects, the charging condition may be determined based on the speed of the vehicle. For example, the system controller 722 may detect the speed of vehicles 702 and 704 and control an amount of power transferred to the vehicles 702 and 704 based on their respective speeds. The system controller 722 can detect the speed of vehicles traveling on the motorway 706 in various ways. In certain aspects, an indication of the speed can be obtained from the vehicle. For example, the vehicle 704 can detect the speed directly (e.g., via wheel rotation) or indirectly (e.g., via global positioning system (GPS)) and report this speed via a wireless communication interface to the system controller 722.

In certain aspects, the speed of a vehicle can be detected by detecting how long the vehicle has been present over a particular base pad. This technique for detecting vehicle speed may be easy to implement but may result in an inaccurate speed value. For example, the amount of time vehicle 704 has been present over a base pad can be measured, based on which power provided to a subsequent base pad can be adjusted.

In certain aspects, the speed of a vehicle can be detected based on the transition of the vehicle from one base pad to another. For example, the amount of time it takes vehicle 702 to travel from one base pad to another base pad can be measured to determine the vehicle's speed. Using this approach, the speed of vehicle 702 can be tracked relatively easily using feedback from respective base pad driving units 710. Thus, this technique may involve communication and coordination between the base pad driving units 710 and the system controller 722.

As presented above, the system controller 722 can estimate the speed of a vehicle based on an amount of power transferred to a vehicle. For example, base pad driving unit #3 may detect an amount of power transferred to vehicle 704 as it travels across the base pad coupled to base pad driving unit #3, based on which the system controller 722 may adjust the amount of power supplied to vehicle 704 by base pad driving unit #2, and in some cases, base pad driving unit #1.

In some cases, the speed of vehicle 702 may be measured by the vehicle itself and provided to the system controller, as presented above. This technique may provide an accurate speed measurement, but may be more complex. For example, vehicle 702 may provide an indication of its speeds to the system controller 722, based on which the system controller 722 can adjust the power provided to vehicle 702. This technique relies on accurate reporting from the vehicle to the system controller 722 and timely control of power to the appropriate base pad. This technique also involves matching the reported vehicle speed with the appropriate base pad based on the location of the vehicle at the time the vehicle speed was measured.

Certain aspects of the present disclosure provide techniques for adjusting the amount of power provided to one or more of the base pads 708. For example, the base pad driving units 710 may adjust the amount of power provided to respective base pads by adjusting the base pad current (e.g., current flow to the coil of the respective base pad). In some cases, when multiple base pad driving units are powered by the same power supply unit such as the power supply unit 716, the power adjustment range may become limited. Moreover, reducing the base pad current can improve the efficiency of the system as compared to operating at full power, depending on how much standing losses are reduced.

In certain aspects, the base pad driving units 710 may adjust the amount of power provided to a respective base pad by providing pulses of power to the respective base pad. For example, the base pad driving units 710 may adjust a duty cycle of pulses of power provided to the base pad to adjust the amount of power. This technique may provide predictable operating conditions, but may result in increased stresses to components of the base pad driving unit due to the transition between on and off states of the components of the base pad driving unit. This technique also provides the advantage of linearly adjusting the power and losses together, maintaining a more constant system efficiency during operation.

In certain aspects, the amount of power adjustment and the timing with which the power adjustment occurs can be varied depending on additional factors such as internal system temperature, external ambient temperature, or any other measurement of factors that may affect the cooling rate of the wireless power transfer system 700. For example, the system controller 722 may determine a temperature of one or more components used to charge the vehicle and/or an ambient temperature and adjust the power transferred to one or more vehicles accordingly. The ambient temperature and the temperature of the components may be estimated or directly measured.

Figure 8:
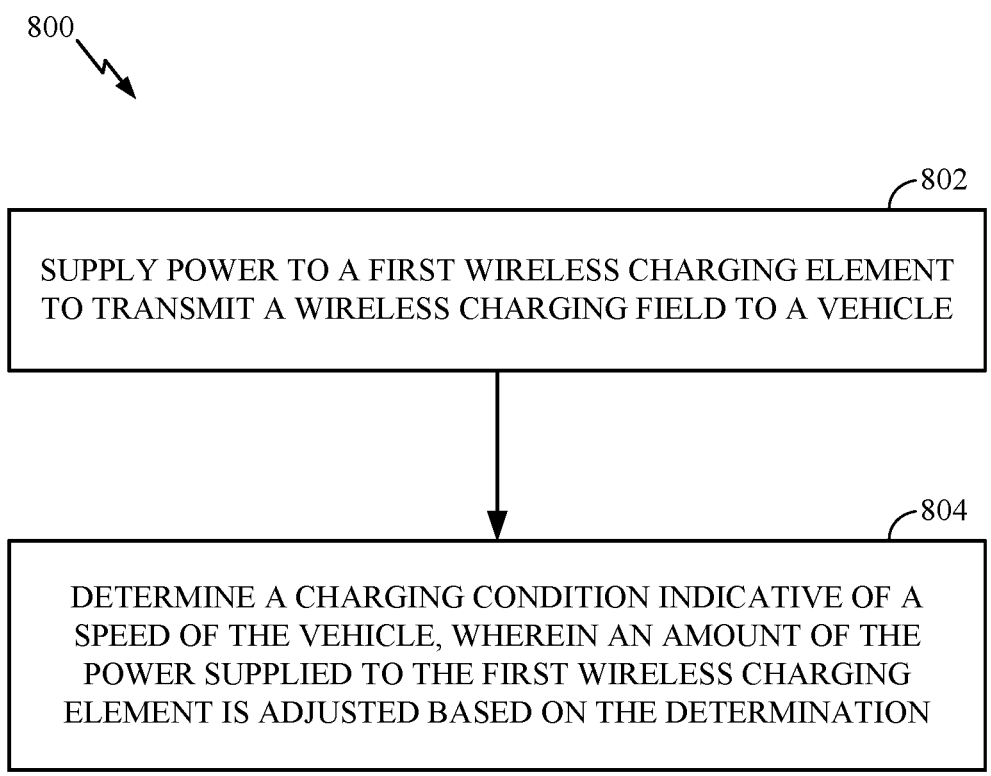
FIG. 8 is a flow diagram of example operations for wireless charging, in accordance with certain aspects of the present disclosure.

FIG. 8 is a flow diagram of example operations 800 for wireless charging, in accordance with certain aspects of the present disclosure. The operations 800 may be performed by a wireless power transfer system, such as the wireless power transfer system 700 of FIG. 7.

The operations 800 may begin, at block 802, by supplying power to a first wireless charging element to transmit a wireless charging field to a vehicle, and at block 804, determining a charging condition indicative of a speed of the vehicle. In certain aspects, an amount of the power supplied to the first wireless charging element at block 802 may be adjusted based on the determination.

In certain aspects, the operations 800 also include determining an amount of power transferred to the vehicle via a second wireless charging element. In this case, the charging condition is determined based on the amount of power transferred. In some cases, the second wireless charging element may be different than the first wireless charging element.

In certain aspects, the operations 800 also include determining the speed of the vehicle based on the charging condition. In certain aspects, determining the speed comprises determining an amount of time the vehicle receives charge from a second wireless charging element. In certain aspects, determining the speed of the vehicle comprises determining an amount of time between the vehicle receiving charge from a second wireless charging element and the vehicle receiving charge from a third charging element. In certain aspects, determining the speed of the vehicle comprises receiving an indication of the speed from the vehicle. In certain aspects, the operations 800 may also include determining an amount of the power to be supplied to the first wireless charging element to maintain a charging rate of a battery of the vehicle, wherein the power is adjusted based on the determined amount of the power.

Figure 9:
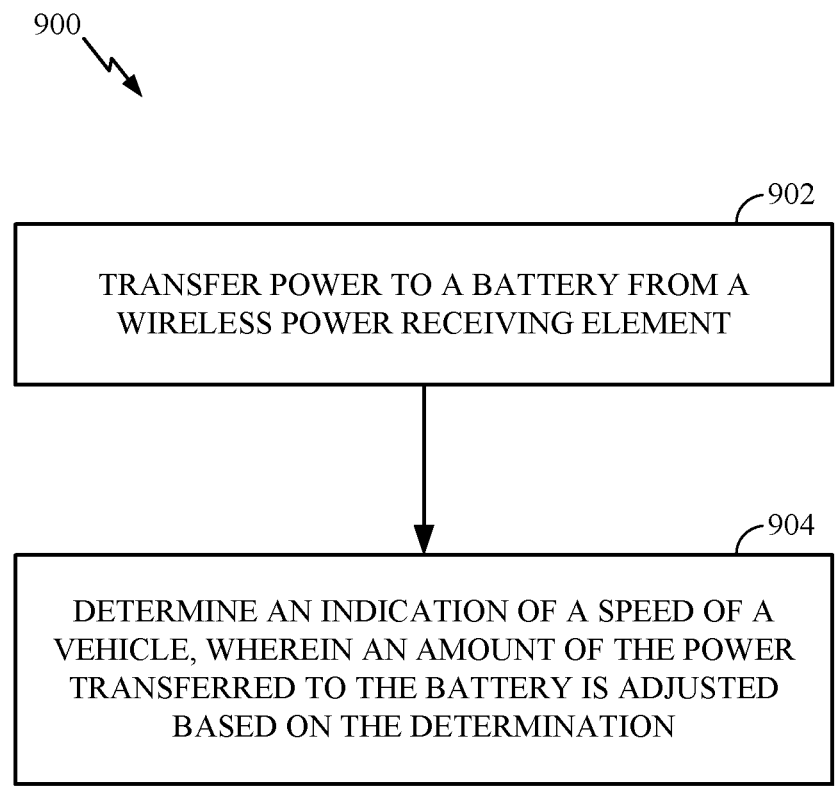
FIG. 9 is a flow diagram of example operations for receiving wireless power to charge a battery, in accordance with certain aspects of the present disclosure.

FIG. 9 is a flow diagram of example operations 900 for wireless charging a vehicle having a battery, in accordance with certain aspects of the present disclosure. The operations 900 may be performed by a wireless power transfer system, such as the wireless power transfer system 700 of FIG. 7.

The operations 900 may begin, at block 902, by transferring power to the battery from a wireless power receiving element, and at block 904, determining an indication of a speed of the vehicle. In certain aspects, an amount of the power transferred to the battery is adjusted based on the determination.

In certain aspects, determining the indication of the speed of the vehicle comprises receiving the indication of the speed. In certain aspects, power transferred to at least one of the battery or one or more electronic components of the vehicle may be decreased if the speed decreases.

In certain aspects, the operations 900 may also include determining at least one of a temperature of a component used to charge the battery or an ambient temperature, wherein the power is further adjusted based on the temperature determination. In this case, determining the at least one of the temperature of the component or the ambient temperature may include measuring the at least one of the temperature of the component or the ambient temperature.

In certain aspects, the operations 900 may also include determining an amount of the power to be transferred to the battery to maintain a charging rate for the battery. In this case, the power transferred to the battery from the wireless power receiving element may be adjusted based on the determined amount of power.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless charging, comprising:
a first wireless charging element;
transmit circuitry coupled to the first wireless charging element and configured to supply power to the first wireless charging element to transmit a wireless charging field to a vehicle; and
a controller coupled to the transmit circuitry and configured to:
determine a charging condition indicative of a speed of the vehicle;
determine the speed of the vehicle based on the charging condition; and
adjust the power supplied to the first wireless charging element via the transmit circuitry based on the speed of the vehicle.

2. The apparatus of claim 1, wherein the controller is configured to determine the charging condition based on an amount of power transferred to the vehicle via a second wireless charging element.

3. The apparatus of claim 1, wherein the controller is configured to determine the speed by determining an amount of time the vehicle receives charge from a second wireless charging element.

4. The apparatus of claim 1, wherein the controller is configured to determine the speed of the vehicle by determining an amount of time between the vehicle receiving charge from a second wireless charging element and the vehicle receiving charge from a third wireless charging element.

5. The apparatus of claim 4, wherein the first wireless charging element is different from the third wireless charging element.

6. The apparatus of claim 1, wherein the controller is configured to determine the speed of the vehicle by receiving an indication of the speed from the vehicle.

7. The apparatus of claim 1, wherein the transmit circuitry is configured to adjust the power by decreasing the power if the speed decreases.

8. The apparatus of claim 1, wherein the transmit circuitry is configured to adjust the power supplied to the first wireless charging element by adjusting a duty cycle of pulses of power provided to the first wireless charging element.

9. The apparatus of claim 1, wherein the transmit circuitry is configured to adjust the power supplied to the first wireless charging element by adjusting an amount of current provided to the first wireless charging element.

10. The apparatus of claim 1, wherein the controller is further configured to determine at least one of a temperature of a component used to charge the vehicle or an ambient temperature, wherein the power is further adjusted based on the temperature determination.

11. The apparatus of claim 10, wherein determining the at least one of the temperature of the component or the ambient temperature comprises estimating the at least one of the temperature of the component or the ambient temperature.

12. The apparatus of claim 1, wherein:
the controller is further configured to determine a power demand of the vehicle based on the charging condition; and
the transmit circuitry is configured to decrease the power supplied to the first wireless charging element if the power demand of the vehicle decreases.

13. The apparatus of claim 1, wherein:
the controller is further configured to determine an amount of the power to be supplied to the first wireless charging element to maintain a charging rate of a battery of the vehicle; and
the transmit circuitry is configured to adjust the power based on the determined amount of the power.

14. The apparatus of claim 1, wherein:
the controller is further configured to determine a power restriction of a plurality of wireless charging elements; and
the transmit circuitry is configured to adjust the power based on the power restriction.

15. An apparatus for wireless charging a vehicle having a battery, comprising:
a wireless power receiving element;
receive circuitry coupled to the wireless power receiving element; and
a controller coupled to the receive circuitry and configured to:
determine an indication of a speed of the vehicle;
based on the speed of the vehicle, determine an amount of power to be transferred to the battery to maintain a charging rate for the battery; and
adjust a power transferred to the battery from the wireless power receiving element based on the determined amount of power.

16. The apparatus of claim 15, wherein the controller is configured to determine the indication of the speed by determining a charging condition of the vehicle.

17. The apparatus of claim 16, wherein the receive circuitry is configured to decrease power transferred to at least one of the battery or one or more electronic components of the vehicle if the speed decreases.

18. The apparatus of claim 15, wherein the controller is configured to determine the indication of the speed of the vehicle by receiving the indication of the speed from the vehicle.

19. The apparatus of claim 15, wherein the controller is further configured to determine at least one of a temperature of a component used to charge the battery or an ambient temperature, wherein the power is further adjusted based on the temperature determination.

20. The apparatus of claim 19, wherein determining the at least one of the temperature of the component or the ambient temperature comprises measuring the at least one of the temperature of the component or the ambient temperature.

21. An apparatus for wireless charging a vehicle having a battery, the apparatus comprising:
a wireless power receiving element;
receive circuitry coupled to the wireless power receiving element; and a controller coupled to the receive circuitry and configured to:
   determine an indication of a speed of the vehicle;
   based on the speed of the vehicle, determine a power restriction of a plurality of wireless charging elements; and
   adjust a power transferred to the battery from the wireless power receiving element based on the power restriction.

22. The apparatus of claim 21, wherein the controller is configured to further adjust the power transferred to the battery from the wireless power receiving element to maintain a charging rate for the battery.

23. A method for wireless charging, comprising:
   supplying, by transmit circuitry coupled to a first wireless charging element, power to the first wireless charging element to transmit a wireless charging field to a vehicle;
   determining, by a controller coupled to the transmit circuitry, a charging condition indicative of a speed of the vehicle, wherein an amount of the power supplied to the first wireless charging element is adjusted based on the determination; and
   determining, by the controller, the speed of the vehicle based on the charging condition, the determining of the speed including determining an amount of time the vehicle receives charge from a second wireless charging element.

24. The method of claim 23, further comprising determining an amount of power transferred to the vehicle via a second wireless charging element, wherein the charging condition is determined based on the amount of power transferred.

25. A method for wireless charging comprising:
   supplying, by transmit circuitry coupled to a first wireless charging element, power to the first wireless charging element to transmit a wireless charging field to a vehicle;
   determining, by a controller coupled to the transmit circuitry, a charging condition indicative of a speed of the vehicle, wherein an amount of the power supplied to the first wireless charging element is adjusted based on the determination; and
   determining, by the controller, a speed of the vehicle based on the charging condition, the determining of the speed of the vehicle including determining an amount of time between the vehicle receiving charge from a second wireless charging element and the vehicle receiving charge from a third charging element.

26. The method of claim 25, wherein the amount of time between the vehicle receiving charge from the second wireless charging element and the vehicle receiving charge from the third wireless charging element is determined based on feedback received from each of the second wireless charging element and the third wireless charging element.

27. A method for wireless charging a vehicle having a battery, comprising:
   transferring, by receive circuitry coupled to a wireless power receiving element, power to the battery from the wireless power receiving element;
   determining, by a controller coupled to the receive circuitry, an indication of a speed of the vehicle;
   determining, by the controller and based on the speed of the vehicle, an amount of power to be transferred to the battery to maintain a charging rate for the battery; and
   adjusting, by the controller, a power transferred to the battery from the wireless power receiving element based on the determined amount of power.

28. The method of claim 27, wherein determining an indication of the speed of the vehicle of the vehicle comprises determining a charging condition of the vehicle.

29. The method of claim 27, wherein determining an indication of the speed of the vehicle of the vehicle comprises receiving an indication of the speed from the vehicle.

30. The method of claim 27, further comprising decreasing, by the controller, power transferred to at least one of the battery or one or more electronic components of the vehicle if the speed decreases.

\* \* \* \* \*